United States Patent Office 3,362,941
Patented Jan. 9, 1968

3,362,941
COPOLYMERS OF TETRAHYDROFURAN AND
OXETANE COMPOUNDS
Subbaraj V. Urs, Cheshire, Conn., assignor to Olin
Mathieson Chemical Corporation, a corporation
of Virginia
No Drawing. Filed Sept. 28, 1964, Ser. No. 399,909
11 Claims. (Cl. 260—88.3)

ABSTRACT OF THE DISCLOSURE

Copolymers are prepared from tetrahydrofuran and an oxetane compound such as 3-allyloxy-oxetane, 3-isopropallyl oxyoxetane, etc., in the presence of a catalyst which can be, for example, boron trifluoride, phosphorus pentafluoride, etc. The copolymers can be vulcanized to yield tough, rubbery materials by heating the solid copolymers at a temperature from about 80° C. to about 250° C. in the presence of sulfur, an organic accelerator and an inorganic accelerator.

---

This invention relates to novel copolymers prepared from oxetane compounds and tetrahydrofuran. More particularly, this invention relates to a process for the preparation of copolymers of tetrahydrofuran and oxetane compounds in the presence of a catalyst and to the resulting novel copolymers.

The oxetane compounds useful in the process of this invention have the formula:

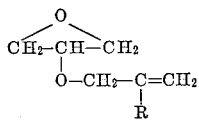

wherein R is selected from the group consisting of hydrogen and alkyl of from 1 to 5 inclusive carbon atoms. For example, the compound 3-allyloxyoxetane, which has the formula:

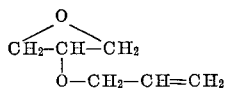

can be made by first chlorinating allyl alcohol to form 2-allyloxy-3-chloro-1-propanol which in a second step is dehydrohalogenated by heating at a temperature of about 75 to 150° C. in the presence of sodium hydroxide to yield 3-allyloxyoxetane.

Oxetane compounds suitable for copolymerizing with tetrahydrofuran include 3-allyloxyoxetane, 3-methallyloxetane, 3-ethallyloxeoxetane, 3-isopropallyloxetane, 3-butallyloxeoxetane, etc.

It is known in the art that tetrahydrofuran can be polymerized in the presence of a wide variety of catalysts. For the most part the products obtained by the reported methods were oily liquids of limited value.

It has been found that the novel copolymers of this invention can be prepared by bringing a mixture of tetrahydrofuran and an oxetane compound into contact with a catalyst selected from the group consisting of phosphorus pentafluoride, triphenyl methyl antimony hexachloride, aluminum isopropoxide, zinc chloride complex, boron trifluoride, boron trifluoride etherate, fluosulfonic acid, antimony pentachloride, etc.

The quantity of the catalyst employed can be varied widely from about 0.1 to about 20 percent based on the total weight of the tetrahydrofuran and oxetane compounds utilized. Preferably, from about 0.5 to about 5.0 percent of the catalyst based on the weight of the tetrahydrofuran and the oxetane compound being copolymerized is utilized in the novel process of this invention. In a like manner, the temperature at which the polymerization process of this invention is conducted can be varied over a wide range. Generally, the polymerization is conducted in a range between about −80° C. and +50° C. and preferably the temperature employed will be from about −80° C. to 0° C. Higher temperatures are not advantageous in that they result in the formation of products with low molecular weights. Also, the yield of the solid copolymer decreases rapidly at higher polymerization temperatures.

In preparing the novel copolymers of this invention from about 1 to about 30 percent by weight of the oxetane compound based on the total weight of the tetrahydrofuran and the oxetane compound is employed and preferably from about 1 to about 10 percent by weight of the oxetane compound based on the total weight of the tetrahydrofuran and the oxetane compound is utilized. The copolymers prepared when higher concentrations of the oxetane compound are utilized range from semisolid to liquids with low molecular weights. These low molecular weight products, however, are useful as plasticizers for the solid copolymer prepared by the method of this invention prior to the vulcanization step.

It has been found that the novel copolymers of this invention can be easily vulcanized or cured to yield tough, rubbery materials which exhibit excellent "snapback" and which have other extremely desirable properties. The vulcanization process is performed by heating the solid copolymer of this invention under pressure at a temperature of from about 80° C. to about 250° C. in the presence of sulfur, an organic accelerator and an inorganic accelerator. Pressures of from about 100 to about 10,000 p.s.i. can be utilized although, preferably, during the curing process the pressure will be from about 500 to about 5,000 p.s.i. Generally, from about 1 to about 15 percent by weight of sulfur based on the weight of the copolymer is employed. Useful organic accelerators include 2-mercaptobenzothiazole, benzothiazyl disulfide, tetramethylthiuram sulfide, zinc dibutyl dithiocarbamate, zinc diethyl dithiocarbamate, etc. The amount of the organic accelerator employed will be from about 1 to about 10 percent by weight based on the weight of the copolymer being cured. Suitable inorganic accelerators include zinc chloride, zinc oxide, lead monoxide, iron oxide, titanium oxide, etc. From about 0.25 to about 10 percent by weight of the inorganic accelerator, based on the weight of the copolymer being cured, will be utilized. If desired, 0.5 to 2.0 percent of zinc stearate or stearic acid can be added to the composition before curing in order to improve the flow characteristics of the polymers. The time required for the curing operation will vary widely, although it generally will be from about 5 minutes to about 3 hours. A wide variety of fillers, as exemplified by silica fiber, iron oxide, zinc oxide, titanium oxide, asbestos, carbon black, etc., can be mixed and cured with the copolymers. The amount of the filler employed generally will be from about 5 percent to about 300 percent based on the weight of the copolymer being cured.

By the process of this invention copolymers having molecular weights of from about 500 to about 30,000 or more can be prepared. Although the exact structure of the copolymers of this invention has not yet been determined, it has been shown that unsaturated side chains are present.

The polymerization reaction of this invention can be carried out in bulk, in dilute systems or in situ, as desired. Although it is not necessary to carry out the polymerization reaction in an inert atmosphere, the exclusion of moisture is necessary. Where diluent polymerization reactions are employed, the useful diluents are those that do not react with the monomers or the catalyst. Suitable diluents include hydrocarbons such as hexane, heptane, decane or dodecane and halogenated hydrocarbons such as methylene chloride, carbon tetrachloride, tetrachloroethane, trifluoro-1,1,2-tribromoethane, etc. Additionally, additives such as stabilizers, antioxidants, plasticizers, pigments, or other colorants can be incorporated with the copolymers of this invention. The choice of the particular additives employed and the method of addition will depend on the end product desired.

The cured copolymers of this invention are useful in a wide variety of applications such as for mechanical, rubber goods, such as belts, diaphragms, etc.

Various embodiments of this invention are illustrated in the following examples which are to be considered not limitative.

*Example I*

One hundred grams by weight of pure and dry tetrahydrofuran were placed in a three-necked flask provided with stirrer, condenser, a thermometer and a nitrogen inlet tube. The flask and contents were cooled to 0° C. by means of an ice bath. Five grams by weight of 3-allyloxyoxetane and one part by weight of phosphorus pentafluoride were added to the flask in which a nitrogen atmosphere was maintained. Stirring was continued for 10 hours during which time a solid copolymer separated out. At the end of 10 hours, the temperature of the flask was allowed to rise to room temperature and the unreacted tetrahydrofuran and residual catalyst were removed by applying a vacuum to the flask. The solid copolymer, after being removed from the flask and washed with methanol to remove unreacted 3-allyloxyoxetane, was dried in a vacuum oven at 30°–50° C. The yield of solid copolymer was about 60 grams. The degree of unsaturation of the copolymer was determined by exhaustive hydrogenation (1.2 mg. of hydrogen was consumed per gram of copolymer).

One hundred parts of the copolymer were placed in a 2-roll mill. Next, 15 parts of high abrasion resistant furnace black, 1 part of sulfur, 2 parts of benzothiazyl disulfide, 0.5 part 2-mercaptobenzothiazole and 0.5 part zinc oxide were added and the mixture milled into a homogeneous sheet. The compounded stock was then placed under a pressure of about 2,000 p.s.i. sheet in a mold and cured by heating at 300° F. for 60 minutes. The mold was chilled in cold water and opened. A tough, cured rubber, with good snap-back property was obtained.

*Example II*

Example I was repeated using 0.5 g. of triphenyl methyl antimony hexachloride [$(C_6H_5)_3C.SbCl_6$] as a catalyst rather than phosphorus pentafluoride. About 60 grams of a slightly dark brown copolymer was obtained. The solid copolymer was vulcanized in the same manner as in Example I, and a tough rubber with good snap-back property was obtained.

*Example III*

In the apparatus described in the Example I, there were placed 100 grams of pure, dry tetrahydrofuran and 6 grams of 3-allyloxyoxetane. The contents of the flask were cooled to 0°–5° C. and 6 grams of fluorosulfonic acid was slowly added into the flask without allowing the temperature of the contents to rise above 20° C. Stirring was continued for 24 hours. In the next step 500 cc. of water was added to the flask and the contents were refluxed for 6 hours to destroy the residual catalyst. The copolymer, which separated out of the reaction mixture was removed using a separatory funnel and washed several times with water to free it of acid after which it was dried.

The thus-obtained copolymer was a liquid containing unsaturation and having terminal hydroxyl groups. The analysis of the copolymer was as follows:

No. of mg. of KOH equivalent to 1 gm. of the polymer—54.0

Unsaturation—1.97 mg. $H_2$/gm. of copolymer

The molecular weight of the copolymer was calculated to be 2070.

What is claimed is:

1. A process for the production of copolymers which comprises copolymerizing tetrahydrofuran with an oxetane of the formula:

$$CH_2-CH-CH_2$$
$$\diagup \quad \diagdown$$
$$O$$
$$|$$
$$O-CH_2-C=CH_2$$
$$|$$
$$R$$

wherein R is selected from the group consisting of hydrogen and alkyl of from 1 to 5 carbon atoms in the presence of a catalyst selected from the group consisting of phosphorus pentafluoride, triphenyl methyl antimony hexachloride, aluminum isopropoxide-zinc chloride complex, boron trifluoride, boron trifluoride etherate, fluosulfonic acid, and antimony pentachloride.

2. The process of claim 1 wherein the weight of the catalyst employed is from about 0.1 to about 20 percent based on the total weight of the tetrahydrofuran and the oxetane.

3. The process of claim 1 wherein the said catalyst is phosphorus pentafluoride.

4. The process of claim 1 wherein the said catalyst is triphenyl methyl antimony hexachloride.

5. The process of claim 1 wherein the said catalyst is fluorsulfonic acid.

6. The process of claim 1 wherein the said oxetane is 3-allyloxyoxetane.

7. The process for the production of a copolymer which comprises copolymerizing tetrahydrofuran with 3-allyloxyoxetane in the presence of from about 0.1 to about 20 percent, based on the total weight of the tetrahydrofuran and the said oxetane, of phosphorus pentafluoride.

8. The process for the production of a copolymer which comprises copolymerizing tetrahydrofuran with 3-allyloxyoxetane in the presence of from about 0.1 to about 20 percent, based on the total weight of the tetrahydrofuran and the said oxetane, of triphenyl methyl antimony hexachloride.

9. The process for the production of a copolymer which comprises copolymerizing tetrahydrofuran with 3-allyloxyoxetane in the presence of from about 0.1 to about 20 percent, based on the total weight of the tetrahydrofuran and the said oxetane, of fluorsulfonic acid.

10. The product produced by the process of claim 1.

11. The product produced by the process of claim 7.

References Cited

UNITED STATES PATENTS 3,205,183   9/1965   Vandenberg _____ 260—2

FOREIGN PATENTS 834,158   5/1960   Great Britain.

MORRIS LIEBMAN, *Primary Examiner.*

S. L. FOX, *Assistant Examiner.*